United States Patent [19]

Chang et al.

[11] Patent Number: 4,665,321
[45] Date of Patent: May 12, 1987

[54] AUTOMATIC CONTROL SYSTEM FOR AUTOMOBILE LIGHTS

[76] Inventors: Kwangling Chang, 293 Kenilworth Avenue, Toronto, Ontario, Canada, M4L 3S9; Louis Imperio, 36 Carlaw Avenue, Toronto, Ontario, Canada, M4M 2R7

[21] Appl. No.: 765,600

[22] Filed: Aug. 14, 1985

[51] Int. Cl.$^4$ .......................... H05B 39/00; B60Q 1/02
[52] U.S. Cl. .................................. 307/10 LS; 315/82; 315/159
[58] Field of Search .......................... 307/10 LS, 10 R; 315/77, 80, 82, 149, 159

[56] References Cited

U.S. PATENT DOCUMENTS

| | | | |
|---|---|---|---|
| 2,888,611 | 5/1959 | Matkins | 307/10 LS X |
| 3,274,434 | 9/1966 | Miller | 315/159 |
| 3,628,085 | 12/1971 | Brock | 315/82 |
| 3,636,357 | 1/1972 | Del Zotto | 315/159 X |
| 3,840,777 | 10/1974 | Brock et al. | 315/82 |
| 3,879,617 | 4/1975 | Faller | 307/10 LS |
| 4,097,839 | 6/1978 | Lesiak | 307/10 LS X |
| 4,558,260 | 12/1985 | Masegi | 307/10 LS X |

*Primary Examiner*—William M. Shoop, Jr.
*Assistant Examiner*—Sharon D. Logan
*Attorney, Agent, or Firm*—David W. Wong

[57] ABSTRACT

The control system is for automatic operation of vehicle lights. It has two distinct switching points corresponding to two predetermined ambient light levels. The first switching point is for turning on the vehicle lights such as after dusk. The second switching point is for turning off the vehicle lights such as after sun rise. The system is free of the chattering problem in common automatic light controls and it is not affected by slight variations in the ambient light condition. It is simple in structure and can be quickly and easily installed in a vehicle. The system includes a timer to delay its actuation momentarily when it is first energized so as to allow full current from the battery to be used for starting the engine. It also includes a temperature compensation to allow for ambient temperature variations.

5 Claims, 4 Drawing Figures

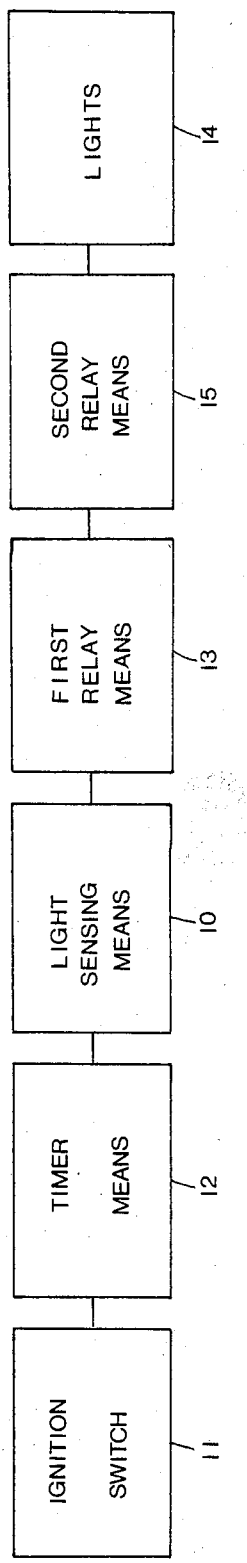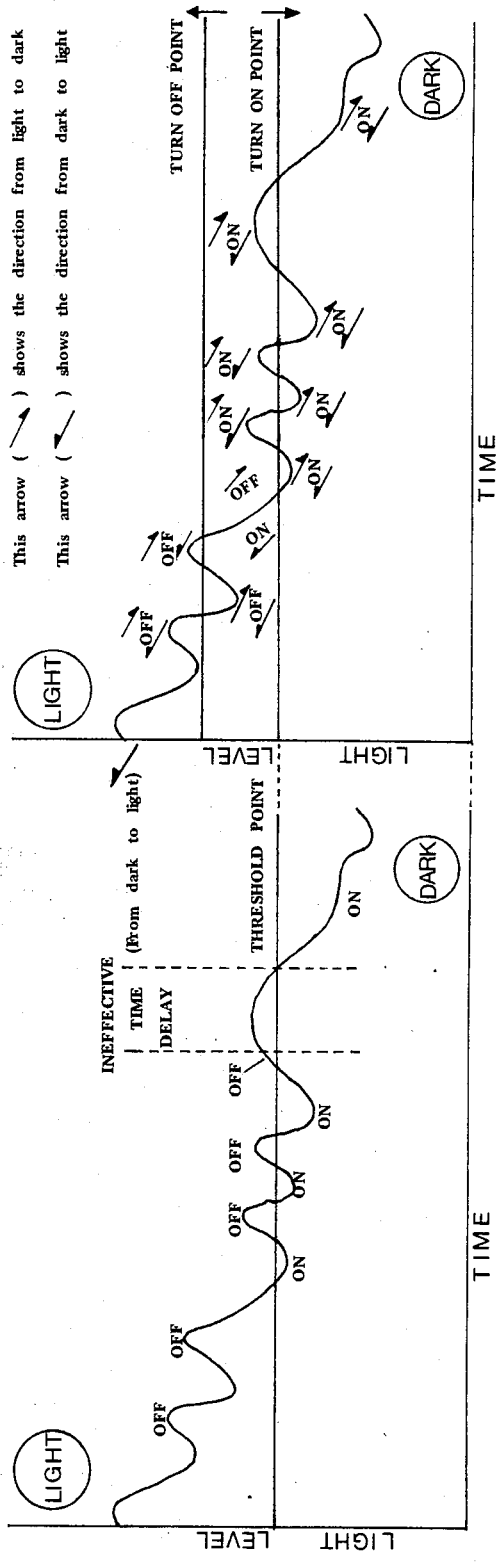

AUTOMATIC CONTROL SYSTEM FOR AUTOMOBILE LIGHTS

BACKGROUND OF THE INVENTION

This invention relates to an automatic control system for automobile lights and particularly relates to an automatic control system responsive to selected ambient light conditions for switching the lights of the automobile on and off.

Automobile automatic headlight control devices are well-known. In such devices, the control is designed to turn the headlights on at night and to turn them off in the day time. A common problem often encountered by such devices is that because the surrounding light condition around the automobile is not constant while the automobile is travelling such as from a fully lighted area to an area shaded with shadows of trees or tall buildings or through underpasses, the sudden changes between bright and dark conditions may render the automatic control to actuate the headlights unintentionally and intermittently. Similarly, the intermittent on and off operations of the headlights may again occur when the automobile is travelling at night and encountering a brightly lighted tunnel or highway, and in some instances the device may even be actuated by the bright light from the headlights of the oncoming automobile. Such unintentional turning on and off of the headlights are highly undesirable and may even be dangerous. Moreover, the switching circuit in the known automatic controls would function in a chattering manner, namely turning on and off in a high frequency uncontrollably when the light condition of the environment is in the margin of the pre-set on and off threshold point. This is mainly due to the fact that the on and off thresholds are set at the same point.

Some known control devices have obviated the above problems by incorporating a time delay circuit therein so that the control does not respond instantly to momentary changes in the ambient light condition. However, such time delay circuit has not been very effective in operation in that if the time period of the fluctuating light of the environment is longer than the delay time period of the control then again the undesirable turning on and off phenomenon as well as the chattering operations would still occur. Furthermore, known control devices are often very complex in construction so that they are costly to manufacture and are also difficult to be installed in an automobile.

OBJECTS OF THE INVENTION

The primary object of the present invention is to provide an automatic control system which effectively and positively turns the headlights and other selected lights of the automobile on or off in selected ambient light conditions.

It is another object of the present invention to provide an automatic control system which is not susceptible to momentary changes in the ambient light condition.

It is another object of the present invention to provide an automatic control system which includes a compensation for the variation in the ambient temperature condition.

It is a further object of the present invention to provide an automatic control system which is simple in construction and can be easily and quickly installed in an automobile.

It is yet a further object of the present invention to provide an automatic control system which may be adapted to actuate the parking lights and instrument panel lights simultaneously with the headlights.

SUMMARY OF THE INVENTION

The present invention is a control system operative for automatically and selectively actuating and deactuating the lights of an automobile. It comprises a light sensing means operative to detect the ambient light conditions around the automobile. A first relay means connected in series with the light sensing means is operative in response to the light sensing means detecting a predetermined ambient light condition to establish an ON state and in response to the light sensing means detecting a second predetermined ambient light condition to establish an OFF state. The first relay means has switch contacts operatively responsive to such ON state of the first relay means to become closed and responsive to the OFF state of the first relay means to become opened. A second relay means having switch contacts therein for operating the lights of the automobile, is connected in series to the first relay means and responsive to the ON state of the first relay means to actuate the lights and also responsive to the OFF state of the first relay means to deactuate the lights.

BRIEF DESCRIPTION OF THE DRAWINGS

Other objects of this invention will appear in the following description and appended claims, reference being made to the accompanying drawings in which:

FIG. 1 is a block diagram showing the general operation of the automatic control system of the present invention.

FIG. 2 is a graph showing the operation of the automatic control versus the ambient light condition of the known control devices.

FIG. 3 is a graph showing operation of the control system versus the ambient light condition in the present invention.

DESCRIPTION OF A SPECIFIC EMBODIMENT

Figure 4:
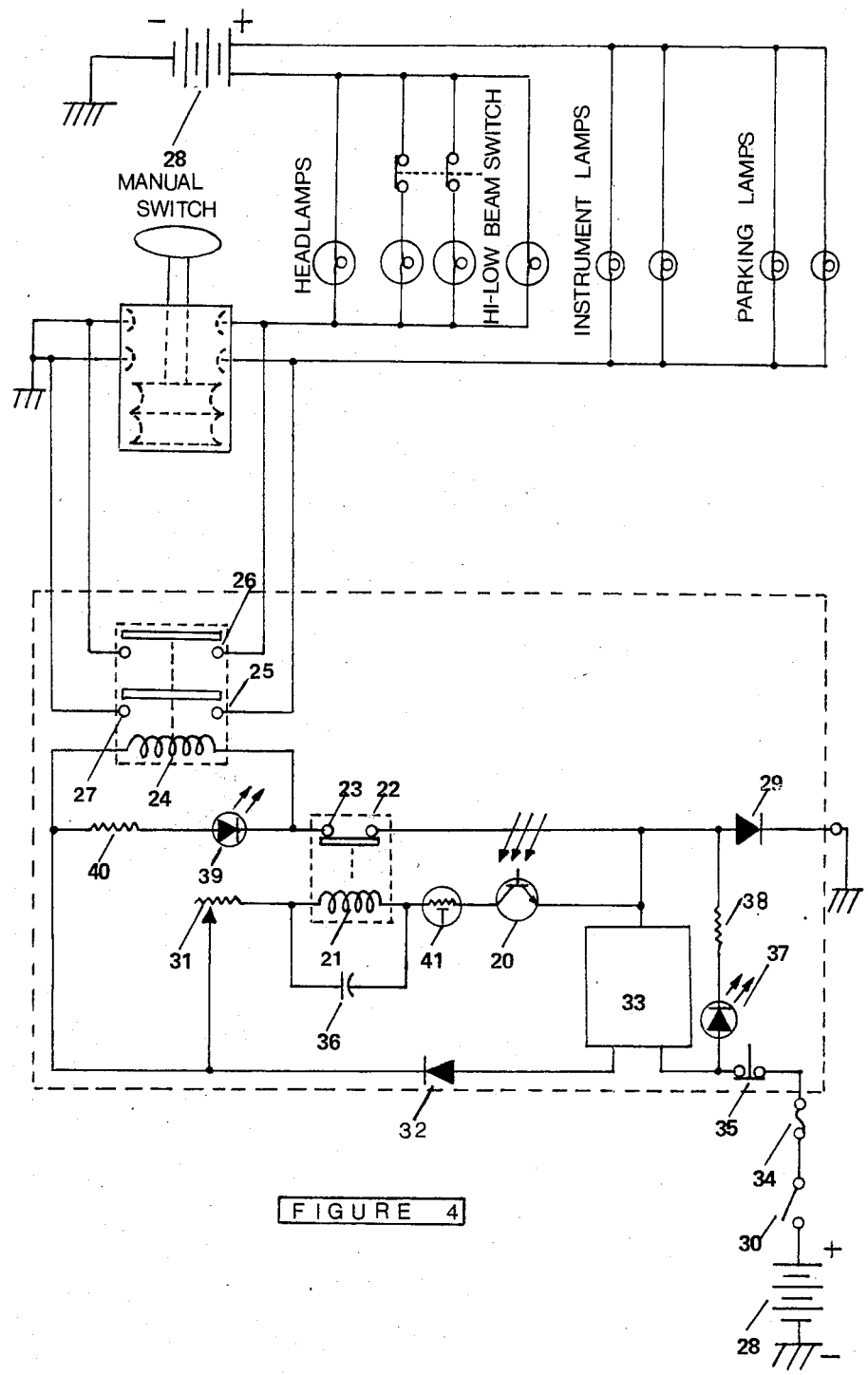
FIG. 4 is a schematic diagram of the automatic control system of the present invention.

With reference to the drawings, the automatic control system of the present invention is generally shown in the block diagram in FIG. 1. It comprises a light sensing means 10 which is rendered operative when the ignition switch 11 in the automobile is turned on. A timer means 12 is provided between the ignition switch 11 and the light sensing means 10 to provide a brief off period of the lighting equipment in order that full current from the battery is available for starting the automobile engine before the lights are automatically turned on at night. The light sensing means operates a first and second relay means 13 and 15 to actuate the automobile lights 14. The relay means 13 is characterized by having two threshold trigger points. One trigger point is the ON point which is responsive to the light sensing means 10 detecting a first pre-selected ambient light condition. The other trigger point is the OFF point which is responsive to the light sensing means 10 detecting a second pre-selected ambient light condition. The ON point is designed to turn on the lights 14 at night in an ambient where the light condition changes gradually from brightness to darkness. The OFF point is, on the other hand, for maintaining the lights off in the daytime as well as when the light condition changes gradually from darkness to brightness. The separation of the ON and OFF points automatically prevents chattering of the switching means and the momentary turning on and off of the automobile lights due to the fluctuating ambient light condition. Such characteristics are best shown in FIGS. 2 and 3.

As shown in the graph in FIG. 2, common control devices are designed to actuate and deactuate the automobile headlights at the same preselected threshold point of ambient light. The curved line represents the fluctuating ambient light condition experienced by the automobile. When the automobile is travelling from a bright area to a dark area it follows the curve from left to right, and when it is travelling from a dark area to a bright area it follows the curve from right to left. For example, when the automobile travels in the daytime in a bright area having some variations of the ambient light condition represented by following the curved line in FIG. 2 from left to right, as soon as it encounters a fluctuating ambient light area with the light level around the threshold point of the light sensor, the automobile lights will be turned on when the ambient light is below the threshold point, and they will be turned off when the ambient light returns to above the same threshold point. Similarly, at night when the automobile is travelling in a fluctuating ambient condition represented by the same curve but going from right to left, the same operation occurs. Such single threshold point control accounts for the intermittent turning on and off and the undesirable chattering of the switching means in the known control devices.

Also, shown in FIG. 2, the provision of a time delay is not effective in eliminating the intermittent turning on and off problem if the fluctuating light condition exceeds the delay time period.

The operation of the switching means of the present invention is characterized by the graph as best shown in FIG. 3 in which the OFF point of the switching means is represented by the upper horizontal line and the ON point of the switching means is represented by the lower horizontal line. Between the upper OFF point and the lower ON point it defines an area in which the automobile light will be either ON or OFF depending on the direction of travel from bright to darkness or vice versa regardless of the fluctuating ambient light condition. For example, when the automobile is travelling in the daytime through a fluctuating ambient light condition area following the curve from left to right, the fluctuating ambient light will fall within the area between the two horizontal lines, and as the light sensing means remains in the OFF condition, the switching means is not sensitive to the fluctuating ambient light. While at night, when the automobile lights are ON and the automobile encounters a fluctuating ambient light condition following the curve from right to left, it again is not susceptible to the fluctuating ambient light within the area between the two horizontal lines.

The second relay means 15 is responsive to the operation of the first relay means 13 to actuate or deactuate the lights 14 of the automobile.

With reference to FIG. 4, a preferred embodiment of the automatic control system according to the present invention comprises a light sensing means 20 such as a phototransistor which is mounted at selected location on the automobile for sensing the ambient light condition. The best location for mounting the light sensing means 20 is on the dash board in the automobile with the sensing means 20 pointing upwards to receive fully the incident light of the sky through the front windshield. Such positioning of the sensing means 20 will also prevent it from receiving the light from the headlights of the oncoming vehicles on the road at night, thus preventing the possibility that the light sensing means 20 to be actuated by the headlights of the oncoming vehicles. The light sensing means 20 is in series with the current coil 21 of a first relay means 22. The contacts 23 of the first relay means 22 are normally closed so that when there is a current flowing through the current coil 21 the contacts 23 will become open. The contacts 23 are in series with the current coil 24 of a second relay means 25. The double pole contacts 26 and 27 of the second relay means 25 serves as the automatic switches for turning the lights of the automobile ON or OFF. The double pole contacts 26 are for controlling the headlights and the contacts 27 are for controlling the parking lights and instrument lights. These contacts have their poles connected in parallel to the wiring of the light manual switch input wires. This will ensure the use of the fully manual operation of the light switch when the automatic control system is turned off. The contacts 26 and 27 are normally opened, namely when the current coil 24 of the second relay means is not energized these contacts are opened. The light sensing means 20 is connected to the negative supply of the battery 28 directly or through the chassis of the automobile. A blocking diode 29 is located between the light sensing means 20 and the negative supply voltage to protect the electrical components from inadvertent erroneous polarity connection to the battery 28. The first relay means 22 is connected to the positive supply voltage of the battery 28 through the ignition switch 30 of the automobile. A variable resistor 31 is provided for adjusting the voltage between the first relay means 22 and the light sensing means 20. A second blocking diode 32 is provided in the supply line to give an additional precautionary protection to the electrical components. A timer 33, a fuse 34 and a manual switch 35 are provided between the first relay means 22 and the ignition switch 30.

The light sensing means 20 and the first relay means 22 forms a voltage divider. Current will flow through the current coil 21 of the first relay means 22 depending on whether or not the resistance of the light sensing means is higher or lower than that of the current coil 21. In the daytime when the light level of the sky is higher than a predetermined level, the resistance of the light sensing means 20 is lower than the current coil 21 thus the current flows through the current coil 21 to energize the first relay means 22. The contacts 23 of the first relay means 22 will become opened, while the contacts 26 and 27 will be opened under this normal condition with no current flowing through the current coil 24 of the second relay means 25. Accordingly, the lights of the automobile are OFF since they are not connected to the battery 28. In the night time, when the incident light from the sky to the light sensing means 20 is below a predetermined level, the resistance of the light sensing means 20 is higher than the resistance of the current coil 21 of the first relay means 22, therefore almost no current flows through the light sensing means 20. The first relay means 22 becomes de-energized and under this normal condition the contacts 23 are closed to cause the current to flow through the current coil 25. The contacts 26 and 27 of the second relay means will become closed when the second relay means 25 is energized thus connecting the lights of the automobile to the battery 28 to turn them on.

As inherent in relay means, the first relay means is characterized by having a drop in point at which its contacts are opened due to a higher current flowing through its current coil and a drop out point at which its contacts are closed due to a lower current flowing through its current coil. Such characteristics advantageously provides the separate ON and OFF points corresponding to the first predetermined light level and second predetermined light level detected by the phototransistor to provide the desirable separate ON and OFF points of the control system as explained above.

The variable resistor 31 provides an adjustment for selecting the light levels for the ON and OFF points of the system.

The timer means 33 provides a time delay for current to flow through the control system after the ignition switch 30 of the automobile has been actuated. Typically, the delay time is about four to ten seconds. This provision prevents the system to be actuated immediately at night when the ignition switch 30 of the automobile is turned on such that the lights of the automobile would not be on while the engine is being cranked. With such arrangement full current from the battery can be used for starting the engine.

The fuse 34 provides an overcurrent protection to the control system in case of any component malfunction.

The manual switch 35 provides a manual control to deenergize the automatic control system, if desired, such as when the automobile is located in a garage for repair so that the lights will not turn on automatically in such a situation when the ignition switch is turned on.

A capacitor 36 is provided in parallel to the current coil 21 of the first relay means 22. The charging cycle of the capacitor 36 serves to prevent any sudden lights from turning off the lights of the automobile at night while the discharge cycle of the capacitor 36 serves to prevent sudden darkness from turning on the lights of the automobile in the daytime.

A light emitting means 37 such as a red colour light emitting diode together with a series resistor 38 is connected across the input terminals of the input terminals to provide a light indication that the automatic control system in energized. Also, a second light emitting means 39 such as a green colour light emitting diode together with the series resistor 40 is connected in parallel with the current coil 24 of the second relay means 25 to provide a green light display indicating that the lights of the automobile are turned on. The green light also provides an indication that the control system is functioning normally.

A thermister 41 is connected to the first relay means 22 and the light sensing means 20 as shown in FIG. 4. The thermister 41 serves as a compensation resistance to the coil resistance of the current coil 21 of the first relay means 22 for temperature changes in any extreme temperature weather condition to ensure a constant current flowing through the current coil 21 and light sensing means 20 at the same light level.

It can be appreciated by those skilled in the art that the sensitivity of the light sensing means 20 can be selected by adjusting the variable resistor 31 such that the control system is not sensitive to the bright lights on highways or in tunnels or underground garages even though the light sensing means is mounted on the dashboard to receive the overhead light.

It can be further appreciated that as shown in FIG. 4 the control system of the present invention due to its simple construction is low cost to produce and it is durable in operation due to relatively few component failure that can occur. Furthermore, the system is simple to install in an automobile, since it only requires two lead connections to the battery and two light switch terminal connections. The fuse 34 may be incorporated in the positive voltage supply line with a through-line fuseholder for convenient fuse replacement.

While the invention has been particularly shown and described with reference to a preferred embodiment thereof, it will be understood by those skilled in the art that various changes in form and detail may be made therein without departing from the spirit and scope of the invention. For example, the connection of the light sensing means may be made in such a manner that it can be selectively disconnected so as to provide an infinite resistance condition representing a total darkness ambient condition with the light sensing means in the system. By so doing the lights of the automobile will be maintained turned on whenever the engine is running even during the daytime.

We claim:

1. A control system for automatically actuating and deactuating the lights of an automobile in response to light conditions, comprising
    a voltage divider having a light sensing means connected in series with a current coil of a first relay means, said light sensing means being connected to a first terminal means operative for connecting to a negative electrode of a voltage supply battery, said first relay means having switching contacts operative to conduct current to a current coil of a second relay means, said second relay means having switching contacts operative for conducting current to said lights of the automobile, said first relay means operative in response to said light sensing means detecting a first predetermined ambient light condition to establish on ON state wherein said switching contacts of said first relay means are closed for conducting current to flow to said current coil of said second relay means, and said first relay means in response to said light sensing means detecting a second predetermined ambient light condition to establish an OFF state wherein said switching contacts of said first relay means are opened for terminating current flow to said current coil for said second relay means,
    an adjustable resistor means connected in series to said first relay means,
    a timer means connected in series to said adjustable resistor means and operative to delay energization of said first relay means and light sensing means for a predetermined time period, said timer means being connected to a second terminal means operative for connecting to a positive electrode of said voltage supply battery,
    a first diode means connected to said light sensing means and to said first terminal means, and
    a second diode means connected to said timer means and to said adjustable resistor means.

2. A control system according to claim 1 including a thermister means connected in series to said light sensing means and to said first relay means.

3. A control system according to claim 2 including a first light emitting means connected to said first terminal means and second terminal means, and operative to emit a light signal indicating the energization of the automatic control system, and a second light emitting means connected in parallel to said current coil of said second relay means, and operative to emitting a second light signal indicating the lights of said automobile being actuated by the automatic control system.

4. A control system according to claim 3 wherein said light sensing means is a phototransistor.

5. A control system according to claim 4 including a manual switch means connected to said second terminal means and to said timer means and operative selectively to energize and de-energize the automatic control system.

* * * * *